(12) United States Patent
Banerjee et al.

(10) Patent No.: US 10,427,725 B2
(45) Date of Patent: Oct. 1, 2019

(54) UNITARY FLOOR

(71) Applicant: NEXGEN COMPOSITES LLC, Franklin, OH (US)

(72) Inventors: Robin Banerjee, Centerville, OH (US); Michael S. Sheppard, Centerville, OH (US)

(73) Assignee: NEXGEN COMPOSITES LLC, Kettering, OH (US)

( * ) Notice: Subject to any disclaimer, the term of this patent is extended or adjusted under 35 U.S.C. 154(b) by 34 days.

(21) Appl. No.: 15/894,264

(22) Filed: Feb. 12, 2018

(65) Prior Publication Data
US 2018/0178855 A1 Jun. 28, 2018

Related U.S. Application Data

(63) Continuation of application No. 15/055,664, filed on Feb. 29, 2016, now Pat. No. 9,896,137.
(Continued)

(51) Int. Cl.
*B62D 33/02* (2006.01)
*B62D 33/04* (2006.01)
(Continued)

(52) U.S. Cl.
CPC .............. *B62D 33/04* (2013.01); *B32B 3/18* (2013.01); *B32B 5/142* (2013.01); *B32B 5/18* (2013.01); *B32B 5/245* (2013.01); *B32B 5/26* (2013.01); *B32B 7/12* (2013.01); *B32B 15/14* (2013.01); *B32B 15/20* (2013.01); *B32B 21/10* (2013.01);
(Continued)

(58) Field of Classification Search
CPC .... B62D 33/02; B62D 33/04; B62D 25/2054; B62D 29/00; B32B 5/02; B32B 5/142; B32B 5/18; B32B 5/245; B32B 5/26; B32B 2250/03; B32B 2250/20; B32B 2250/40;
(Continued)

(56) References Cited

U.S. PATENT DOCUMENTS 2,485,047 A 2/1947 Greig
2,508,674 A 5/1950 Jolly
(Continued)

FOREIGN PATENT DOCUMENTS

| GB | 428300 | 5/1935 |
| NL | 92000563 | 10/1993 |
| WO | 9321404 | 10/1993 |

*Primary Examiner* — Gregory A Blankenship
(74) *Attorney, Agent, or Firm* — Thomas E. Lees, LLC

(57) ABSTRACT

A unitary floor system comprising a top layer, a bottom layer, and, and an intermediate layer including a longitudinal central floor axis. Further, the intermediate layer comprises floor components that define at least one edge line, wherein the floor components are tiled together and sandwiched between the top layer and the bottom layer to provide an integral structure that comprises a continuous surface, unitary floor and a frame that surrounds the floor components. Each of the floor components comprises a composite assembly of a first set of material strips and a second set of material strips. The first set of material strips has a different density compared to the second set of material strips, and edge lines of the floor components span between the longitudinal central floor axis and the frame, wherein the floor components do not cross the longitudinal central floor axis.

20 Claims, 12 Drawing Sheets

Related U.S. Application Data

(60) Provisional application No. 62/299,712, filed on Feb. 25, 2016.

(51) Int. Cl.

| | | |
|---|---|---|
| *B62D 25/20* | (2006.01) | |
| *E04F 15/02* | (2006.01) | |
| *E04F 15/10* | (2006.01) | |
| *B32B 3/18* | (2006.01) | |
| *B32B 37/12* | (2006.01) | |
| *B62D 29/00* | (2006.01) | |
| *B32B 5/14* | (2006.01) | |
| *B32B 5/18* | (2006.01) | |
| *B32B 5/24* | (2006.01) | |
| *B32B 5/26* | (2006.01) | |
| *B32B 7/12* | (2006.01) | |
| *B32B 15/14* | (2006.01) | |
| *B32B 15/20* | (2006.01) | |
| *B32B 21/10* | (2006.01) | |
| *B32B 27/12* | (2006.01) | |

(52) U.S. Cl.
CPC .............. *B32B 27/12* (2013.01); *B32B 37/12* (2013.01); *B62D 25/2054* (2013.01); *B62D 29/00* (2013.01); *E04F 15/02038* (2013.01); *E04F 15/102* (2013.01); *E04F 15/107* (2013.01); *B32B 2250/03* (2013.01); *B32B 2250/20* (2013.01); *B32B 2250/40* (2013.01); *B32B 2260/023* (2013.01); *B32B 2260/046* (2013.01); *B32B 2262/101* (2013.01); *B32B 2307/722* (2013.01); *B32B 2419/04* (2013.01); *B32B 2605/00* (2013.01); *B62D 33/02* (2013.01)

(58) Field of Classification Search
CPC .......... B32B 2307/722; B32B 2419/04; B32B 2605/00; B32B 3/18
USPC ...................................... 296/184.1
See application file for complete search history.

(56) References Cited

U.S. PATENT DOCUMENTS

| | | | |
|---|---|---|---|
| 2,540,400 A | 2/1951 | McHenry | |
| 3,692,349 A | 9/1972 | Ehrlich | |
| 5,041,322 A | 8/1991 | Fouquet | |
| 5,285,604 A | 2/1994 | Carlin | |
| 5,509,715 A | 4/1996 | Scharpf | |
| 5,679,191 A | 10/1997 | Robinson | |
| 5,772,276 A | 6/1998 | Fetz et al. | |
| 5,928,735 A | 7/1999 | Padmanabhan et al. | |
| 6,179,942 B1 | 1/2001 | Padmanabhan | |
| 6,183,824 B1 | 2/2001 | Padmanabhan et al. | |
| 6,558,765 B2 | 5/2003 | Padmanabhan | |
| 6,558,766 B2 | 5/2003 | Padmanabhan et al. | |
| 6,740,381 B2 | 5/2004 | Day et al. | |
| 7,393,577 B2 | 7/2008 | Day et al. | |
| 7,765,758 B2 | 8/2010 | Chorney et al. | |
| 7,972,707 B2 | 7/2011 | Padmanabhan | |
| 8,389,104 B2 | 3/2013 | Day et al. | |
| 8,646,183 B2 | 2/2014 | Tompkins et al. | |
| 8,770,904 B2 | 7/2014 | Henriksen, Jr. | |
| 8,857,125 B2 | 10/2014 | Lu et al. | |
| 8,950,144 B2 | 2/2015 | Padmanabhan | |
| 9,174,419 B2 | 11/2015 | Utsumi | |
| 2001/0003623 A1* | 6/2001 | Padmanabhan | B32B 21/08 428/479.6 |
| 2001/0035264 A1 | 11/2001 | Padmanabhan | |
| 2007/0000921 A1 | 1/2007 | Butler et al. | |
| 2007/0193179 A1* | 8/2007 | Risi | B32B 3/12 52/591.4 |
| 2011/0291441 A1* | 12/2011 | Burton | B27N 3/04 296/184.1 |
| 2012/0015131 A1 | 1/2012 | Akarsu et al. | |
| 2012/0251758 A1* | 10/2012 | Hashimoto | B29C 44/468 428/44 |
| 2013/0014464 A1 | 1/2013 | Risi et al. | |
| 2015/0239508 A1* | 8/2015 | Padmanabhan | B62D 25/2054 296/184.1 |
| 2016/0116213 A1* | 4/2016 | Dykes, Jr. | B62D 21/20 296/25 |
| 2017/0247063 A1* | 8/2017 | Banerjee | B32B 5/18 |
| 2018/0297339 A1* | 10/2018 | Fergusson | B29C 70/66 |
| 2019/0061832 A1* | 2/2019 | McCloud | B62D 25/2054 |

\* cited by examiner

UNITARY FLOOR

CROSS REFERENCE TO RELATED APPLICATIONS

This application is a continuation of U.S. patent application Ser. No. 15/055,664, filed Feb. 29, 2016, entitled UNITARY FLOOR, now allowed, which claims the benefit of U.S. Provisional Patent Application Ser. No. 62/299,712, filed Feb. 25, 2016, entitled UNITARY FLOOR.

STATEMENT REGARDING FEDERALLY SPONSORED RESEARCH OR DEVELOPMENT

This invention was made with government support under Contract No. W56HZV15C0078 awarded by the U.S. Army. The Federal Government has certain rights in the invention.

BACKGROUND

Various aspects of the present disclosure relate generally to a floor, and specifically to a unitary floor, and a method of fabricating a unitary floor.

Large containers are often utilized for storing items and/or for transporting items from one location to another. For instance, a semi-trailer is a type of container that is pulled by a road tractor, thus providing a convenient and widely used means to transport goods across public roads including interstates, highways, and other roadways. One of the most common types of semi-trailer, known as a box trailer, is essentially a box-shaped container on wheels, making the semi-trailer suitable for temporarily storing, securing, and hauling various types of cargo. For instance, a box trailer includes a container that is typically about eight feet (about 2.44 meters) wide and about 13 feet (about 3.96 meters) high. A box trailer also has a relatively long overall length, e.g., a length ranging from about 28 feet (about 8.53 meters) to over 50 feet (about 15.24 meters) in length in some circumstances.

A box trailer has one or more doors, typically located along the back of the trailer, to provide ingress and egress for loading contents into, and unloading contents from, the trailer. For instance, workers operating forklift trucks, pallet jacks, and other materials handling devices can cooperate to move cargo into the trailer for transportation to a desired destination. Once a trailer is loaded, the doors can be closed and latched shut from the outside.

BRIEF SUMMARY

According to aspects of the present disclosure, a unitary floor system comprising a top layer, a bottom layer, and, and an intermediate layer. The intermediate layer includes a longitudinal central floor axis along a major length of the intermediate layer, thereby defining a first side and a second side. Further, the intermediate layer comprises floor components that define at least one edge line, wherein the floor components are tiled together and sandwiched between the top layer and the bottom layer to provide an integral structure that comprises a continuous surface, unitary floor and a frame that surrounds the floor components. Each of the floor components comprises a composite assembly of a first set of material strips and a second set of material strips. The first set of material strips has a different density compared to the second set of material strips, and edge lines of the floor components span between the longitudinal central floor axis and the frame, wherein the floor components do not cross the longitudinal central floor axis from the first side to the second side.

According to still further aspects of the present disclosure, a unitary floor system comprising a top layer, a bottom layer, and, and an intermediate layer. The intermediate layer includes a longitudinal central floor axis along a major length of the intermediate layer, thereby defining a first side and a second side. The intermediate layer comprises floor components that define at least one edge line, wherein the floor components are tiled together and sandwiched between the top layer and the bottom layer to provide an integral structure that comprises a continuous surface, unitary floor; and a frame that surrounds the floor components. Each of the floor components is comprised of a composite assembly of material strips that includes a first set of material strips and a second set of material strips, and the first set of material strips has a different density compared to the second set of material strips. At least one edge line of the floor components on one opposing side extends oblique to the longitudinal central floor axis, and edge lines of floor components on the first side of the longitudinal central floor axis are offset along the longitudinal central floor axis from edge lines of floor components on the second side of the longitudinal central floor axis.

DETAILED DESCRIPTION

Aspects of the present disclosure provide unitary floors that replace conventional floors. Particularly, a unitary floor constructed as set out herein, can be configured to satisfy user-specified dimensions and load ratings, dynamic loading, etc., while providing a floor that is lighter than what is realized in conventional flooring technologies at comparable dimensions and load ratings. In this regard, the unitary floors described herein are particularly well suited for applications such as semi-trailer floors, because fuel efficiency is improved for a tractor pulling a semi-trailer utilizing the disclosed floor.

Moreover, the unitary floor described herein provides a continuous surface that can be smooth or some other desired surface texture that is best suited to a particular application. For instance, in the application of a semi-trailer, forklift trucks will drive into and out of the trailer during use. A conventional semi-trailer floor imposes potentially significant stress on the forklifts and loads carried thereby due to cracks and unevenness inherent in floorboards. However, the unitary floor herein can be configured with a smooth, continuous surface that reduces vibration and stresses otherwise typically imposed upon forklifts.

Moreover, to attain desired load ratings necessary for typical semi-trailer applications, conventional floors are hardwood, which is heavy, made of many pieces and prone to damage. Comparatively, the unitary floor disclosed herein is assembled in stages prior to unitization, using light-weight components that are easy to machine, cut and manipulate, thus easing the task of construction. Thus, the floors herein avoid the artefacts of conventional floor construction.

Figure 1:
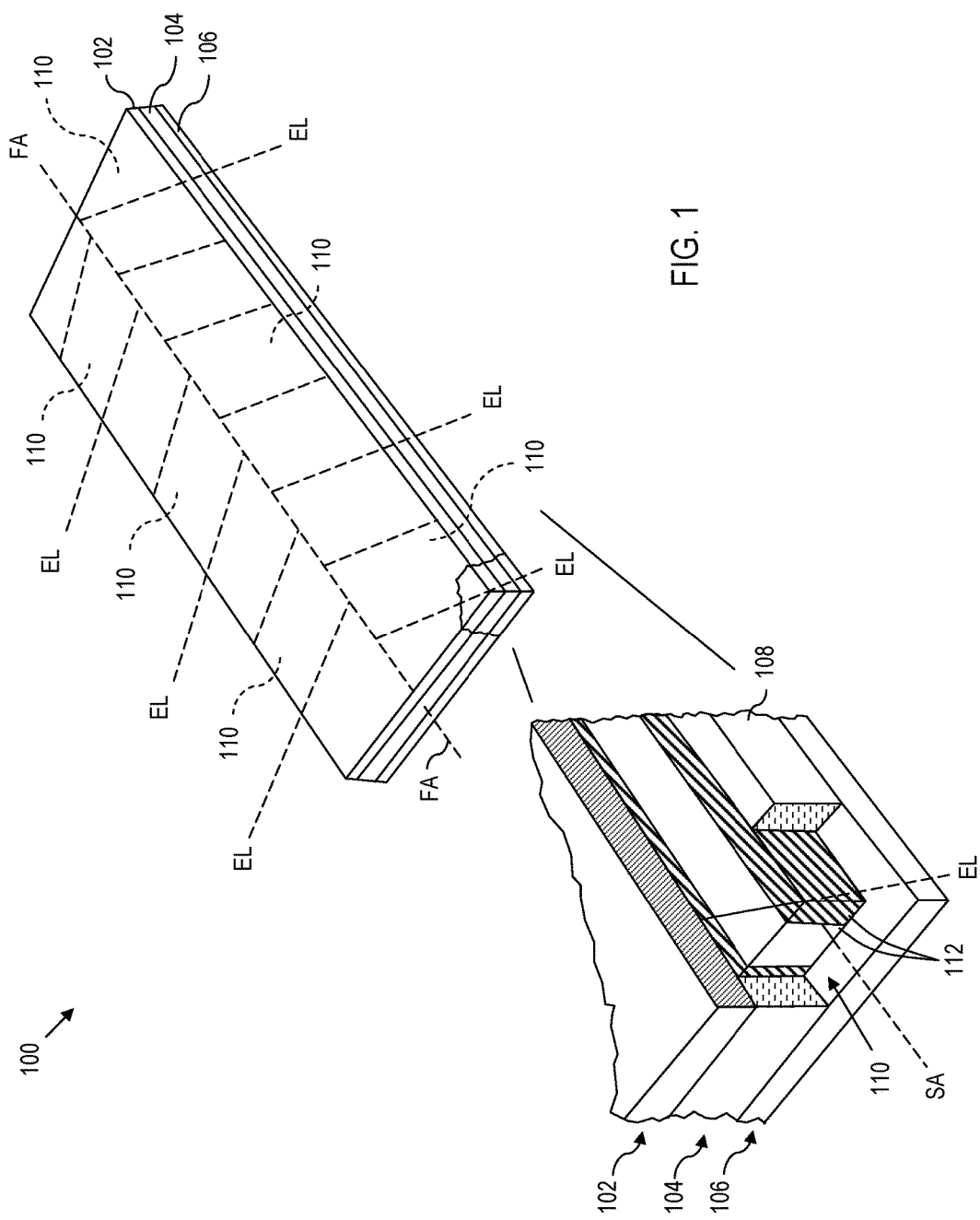
FIG. 1 is a perspective view of a unitary floor showing an enlarged corner portion of the unitary floor with some material removed to reveal additional details.

Referring now to the drawings, and in particular to FIG. 1, a unitary floor 100 (also referred to herein as a unitary floor system) is constructed in accordance with an embodiment of the present disclosure. The unitary floor 100 includes in general, a top layer 102, a bottom layer 106, and an intermediate layer 104 sandwiched between the top layer 102 and the bottom layer 106 to provide an integral structure.

In the illustrated example, the top layer 102 forms a continuous surface. This surface can be smooth, textured or have other features as the specific application dictates. This allows an optimal configuration of the floor surface for intended uses, e.g., for use by forklift trucks, pallets, etc. The continuous floor also makes it convenient to secure the unitary floor 100 to a structure, e.g., a semi-trailer frame, such as by minimizing required fasteners, as will be described herein. In alternate embodiments, the top layer need not form a continuous surface.

Likewise, as illustrated in FIG. 1, the bottom layer 106 forms a continuous surface. The continuous bottom surface defined by the bottom layer 106 can be advantageous, such as to provide protection to the intermediate layer 104. For instance, when a unitary floor 100 is used in a semi-trailer, road debris, rain, dirt and other contaminants are prevented from penetrating the unitary floor 100 to reach the intermediate layer 104. This can potentially dramatically extend the life of the floor compared to conventional floors. In certain implementations, the bottom layer 106 need not be continuous.

The intermediate layer 104 is illustrated as including a floor frame 108 for sake of discussion. However, in certain applications, a floor frame 108 is not necessary. Also, in certain applications, it is sufficient to have a partial floor frame 108, e.g., floor frame members extending longitudinally down the length on each end, but not across the width. In yet further configurations, the floor frame 108 can extend across the width on each end, but not along length, etc. The intermediate layer 104 also includes a plurality of floor components 110 that are positioned within the floor frame 108.

In the illustrated example, the unitary floor 100 has a longitudinal central floor axis FA, which extends along the major length of the unitary floor 100. Moreover, in the example implementation, each of the plurality of floor components 110 has at least one edge, designated as edge line EL. In the illustrative example, each edge EL of the floor components 110 extends oblique to the longitudinal central floor axis FA of the unitary floor 100. For clarity of discussion, only some of the floor components 110 are indicated with an oblique edge line EL in FIG. 1. In alternative implementations, the edge lines EL are perpendicular to the longitudinal central floor axis FA Also, as shown in the enlarged corner portion of the unitary floor 100 in FIG. 1, a portion of the top layer 102 and a portion of the floor frame 108 are removed to reveal that at least one of the floor components 110 is comprised of a plurality of material strips 112. In the illustrated implementation, each of the material strips 112 has a longitudinal strip axis SA that is parallel to the longitudinal central floor axis FA of the unitary floor 100. In practice, each of the floor components 110 is comprised of material strips 112 having a longitudinal strip axis SA that is parallel to the longitudinal central floor axis FA of the unitary floor 100.

In the illustrated configuration, at least one edge line EL of each of the floor components 110 is oblique the longitudinal central floor axis FA of the unitary floor 100. As such, at least one edge line EL is also oblique to the longitudinal strip axes SA of the material strips 112. However, as noted above, the edge lines EL need not be oblique to the longitudinal central floor axis FA of the unitary floor 100.

Also as illustrated, the material strips 112 can comprise the same material and construction, or the material strips 112 can be one or more different types of strips. Moreover, the strips can be a composite material or simple material. For instance, strips of different density, width, construction, composition of material, combinations thereof, etc., can be used to achieve a balance of strength, deflection, weight, combinations thereof, etc. For instance, in an example implementation, the material strips 112 that make up a corresponding floor component 110 is a composite assembly that includes a first set of material strips interleaved with a second set of material strips. Here, the first set of material strips includes a different density (e.g., the first set of material strips is more dense than the second set of material strips) compared to the second set of material strips.

Where the material strips 112 are interleaved, the interleaving can be strict, i.e., a material strip of a first type is adjacent only to material strips of a second type, and a material strip of the second type is adjacent only to material strips of the first type. Alternatively, the interleaving can be based upon a pattern. For instance, material strips of one or more types (e.g., different density, composition, materials, combinations thereof, etc.) can be formed into two or more combinations of sub-assemblies, and the various sub-assemblies can be interleaved.

Where different types of material strips 112 are provided, the different materials that make up the material strips 112 can be interleaved, book-ended, or arranged in other patterns. In a non-limiting example implementation, the first set of material strips includes wood strips, and the second set of material strips includes foam strips. Moreover, the foam strips can include low density closed cell foam, cross rib fiberglass, foam strips covered on at least one face by fibrous reinforcement material, fiberglass reinforced plastic, other suitable material, combinations thereof, etc. Moreover, reinforcements can be provided, e.g., transverse plates, ribbing, etc., to increase the strength of the material strips 112 for a given application.

In this example implementation, the wood strips are not wrapped in fiberglass. However, the wood can comprise a long grain hardwood. Moreover, the top and bottom surfaces of the hardwood can be roughened so that the top layer 102 better laminates to the wood strips.

In an exemplary implementation, the floor components are tiled (i.e., arranged so as to fill the entire area of the unitary floor 100 with no substantial overlap and no significant gaps). More particularly, in this example implementation, the floor components 110 are tiled together such that the material strips 112 have a longitudinal strip axis SA that is parallel to a longitudinal central floor FA axis of the unitary floor 100. Moreover, each floor component 110 has at least one edge that is oblique to the longitudinal central floor axis FA. However, other configurations can also be implemented.

Figure 2:
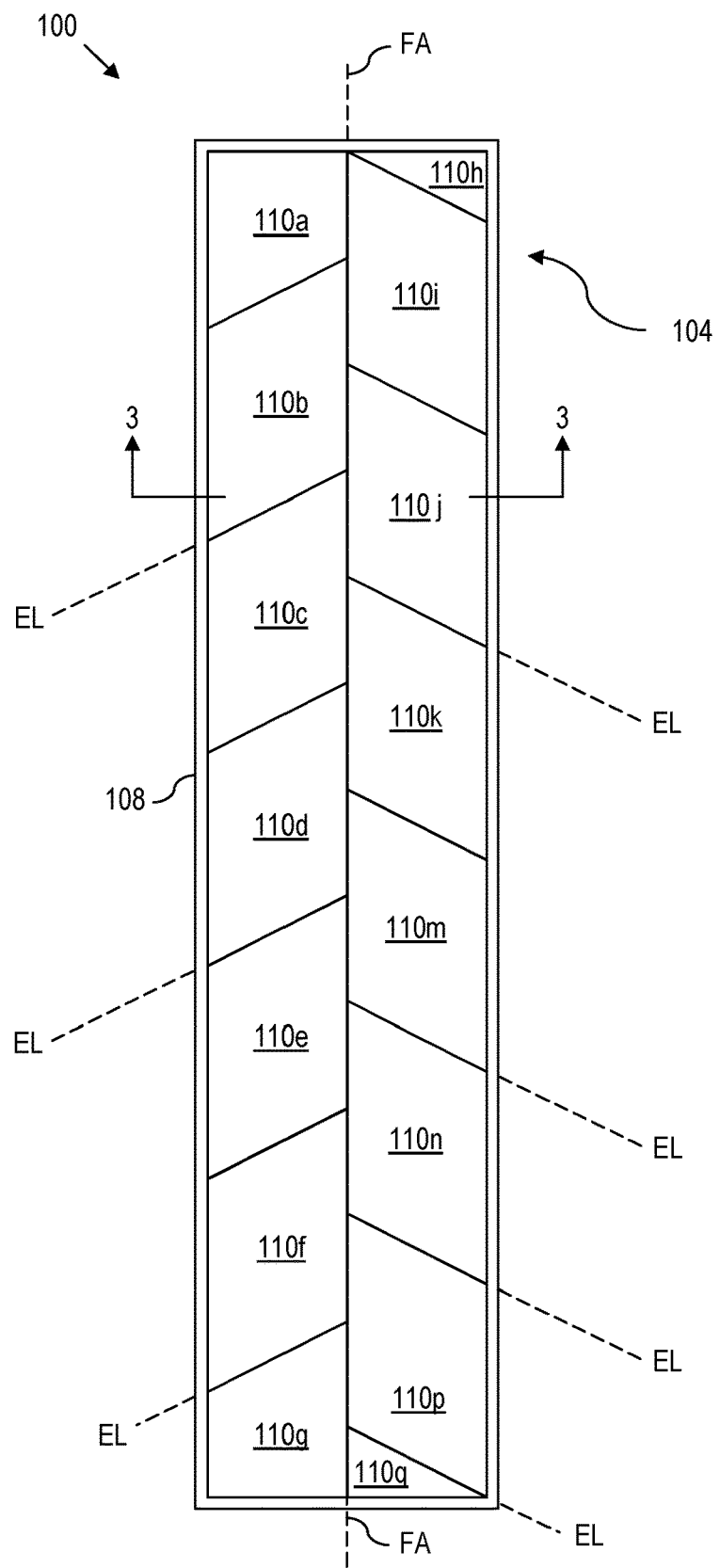
FIG. 2 is a top view of the unitary floor of FIG. 1, showing a top layer removed to show floor components that make up an intermediate layer of the unitary floor.

Referring to FIG. 2, a unitary floor 100 of FIG. 1 is shown with the top layer 102 removed. As illustrated, the intermediate layer 104 comprises a frame 108 and floor components 110 tiled within the frame 108. In this regard, the illustrated floor frame of the unitary floor is rectangular-shaped and is dimensioned to fit the form of a conventional semi-trailer. However, other dimensions and applications are also contemplated. Moreover, as illustrated, the floor components 110 entirely fill the area defined within the floor frame 108. However, the floor components 110 need not entirely fill the floor frame 108 in some examples. The material strips 112 as described with reference to FIG. 1, are not shown in FIG. 2 for clarity of discussion.

In the example floor implementation, seven floor components 110 (i.e., floor components 110a, 110b, 110c, 110d, 110e, 110f, and 110g) are located on one side (i.e., the left side looking at FIG. 2) of the longitudinal central floor axis FA of the unitary floor 100. Eight floor components 110 (i.e., floor components 110h, 110i, 110j, 110k, 110m, 110n, 110p, and 110q) are located on the opposite side (i.e., the right side looking at FIG. 2) of the longitudinal central floor axis FA of the unitary floor 100. It should be noted that the reference letters "l" and "o" are not used to identify any floor component shown in FIG. 2 because of their similarity to the number digits of one and zero, respectively.

As shown in the example embodiment of FIG. 2, the floor component 110p has two edge lines EL that extend oblique to the longitudinal central floor axis FA of the unitary floor 100. Each of the other floor components 110a, 110b, 110c, 110d, 110e, 110f, 110g, 110h, 110i, 110j, 110k, 110m, 110n, and 110q has a similar one or more edge lines EL that extend oblique to the longitudinal central floor axis FA. In some implementations, the edge lines EL can alternatively be perpendicular to the longitudinal central floor axis FA of the unitary floor 100.

As shown in FIG. 2, each of the floor components 110 need not be the same size. For instance, in the illustrated example, each of the floor components 110 is either a full-size component (such as a parallelogram-shape) or a trim-size component (such as a cut of a parallelogram-shaped component). Moreover, the parallelogram-shape may comprise a rhombus-shape, for example. More specifically, eleven of the floor components 110 (i.e., floor components 110b, 110c, 110d, 110e, 110f, 110i, 110j, 110k, 110m, 110n, and 110p) are the full-size parallelogram-shaped floor components. Four of the floor components 110 (i.e., floor components 110a, 110g, 110h, and 110q) are the smaller trim-size floor components.

Moreover, as illustrated, the floor components 110 are staggered so that adjacent floor components 110 on opposite sides of the longitudinal central floor axis FA do not align along at least one edge. For instance, the edges oblique to the longitudinal central floor axis FA of floor component 110b do not intersect or otherwise align with the edges oblique to the longitudinal central floor axis FA of floor component 110i or floor component 110j.

In an example implementation, one or more of the floor components 110 is scarf jointed with at least one adjacent floor component 110 along a line that extends parallel to the longitudinal central floor axis FA (and hence the longitudinal strip axes SA of the plurality of material strips) of the unitary floor 100. In another example implementation, one or more of the floor components 110 is scarf jointed with at least one adjacent floor component 110 along a line that extends oblique (or perpendicular in certain implementations) to the longitudinal central floor axis FA (and hence the longitudinal strip axes SA of the plurality of material strips).

In yet another example implementation, each of the floor components 110 is scarf jointed with at least one adjacent floor component 110 along a line that extends parallel to the longitudinal central floor axis FA of the unitary floor 100, and is scarf jointed with at least one adjacent floor component 110 along a line that extends oblique (or perpendicular in certain implementations) to the longitudinal central floor axis FA and longitudinal strip axes SA of the plurality of material strips of the associated floor component 110.

At least one edge that is oblique to the longitudinal central floor axis FA forms an angle relative to the longitudinal central floor axis FA. In a first illustrative example implementation, the angle is about 60 degrees or less. In other words, the edge can range from parallel up to about 60 degrees relative to the longitudinal edge of the floor frame 108. In the example implementation shown in FIG. 2, each of the oblique edge lines EL forms an angle about 60 degrees relative to the longitudinal central floor axis FA or the longitudinal edge of the floor frame 108, solely for clarity of illustration. In alternate embodiments, other oblique angles may be utilized. In yet another example, the angle is selected to minimize the number of discontinuities in longitudinally adjacent material strips 112 between the support beams of the floor at any given position on the floor.

Figure 3:
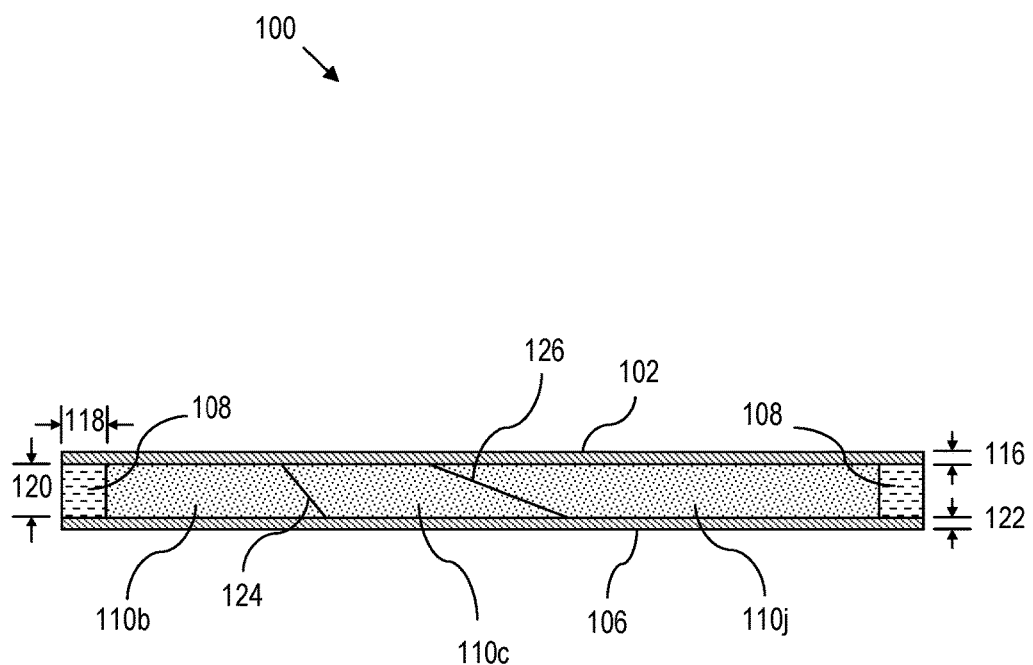
FIG. 3 is an example sectional view, taken approximately along line 3-3 shown in FIG. 2, of the unitary floor.

Referring to example sectional view of FIG. 3, the top layer 102 has a vertical thickness 116 that is exaggerated for clarity of discussion herein. In an example implementation, the top layer 102 is a resin injected, fabric unitary layer. As an example, the top layer 102 comprises fiberglass fabric commercially available from Owens Corning Company located in Toledo, Ohio. In alternative implementations, the top layer 102 can be implemented using alternative materials. The top layer 102 provides a continuous layer with a smooth surface that spans the area within the border of the floor frame 108. In example implementations, such as where the top layer 102 is resin injected, it is also possible to form various designed-for surface treatments to the top surface, as the specific application dictates.

The floor frame 108 comprises a wood-type of frame having a horizontal thickness 118 and a vertical thickness 120 that can be determined based upon the specific application. In alternative implementations, the floor frame 108 may be another type (or types) of material.

The bottom layer 106 has a vertical thickness 122 that is also exaggerated for clarity of discussion herein. In an example implementation, the bottom layer 106 is a resin injected, fabric layer, analogous to the top layer 102. It is conceivable that both the bottom layer 106 and the top layer 102 comprise the same material. As an example, the bottom layer 106 comprises fiberglass fabric commercially available from Owens Corning Company located in Toledo, Ohio. In alternative implementations, the bottom layer 106 can be implemented using alternative materials. For instance, in an example implementation, the top layer 102 is a resin infused fabric and the bottom layer 106 is material such as aluminum. The bottom layer 106 provides a continuous layer with a surface that spans the area within the border of the floor frame 108. As with the top layer 102, the bottom layer 106 can be designed so as to have a surface texture as the specific application dictates.

In the example implementation, a scarf joint 124 joins floor component 110b and floor component 110c (floor components 110 that are adjacent in the lengthwise direction of the unitary floor 100), and a scarf joint 126 joins floor component 110c and floor component 110j (floor components 110 that are adjacent in the transverse, i.e., width direction of the unitary floor 100). For clarity of discussion herein, the size of the scarf joint 124 and the size of the scarf joint 126 are shown exaggerated. Both scarf joints 124, 126 shown in FIG. 3 are plain scarf joints. In alternative implementations, any type of scarf joint can be implemented. Moreover, in alternative implementations, any type of joint other than a scarf joint can be implemented.

Figure 4:
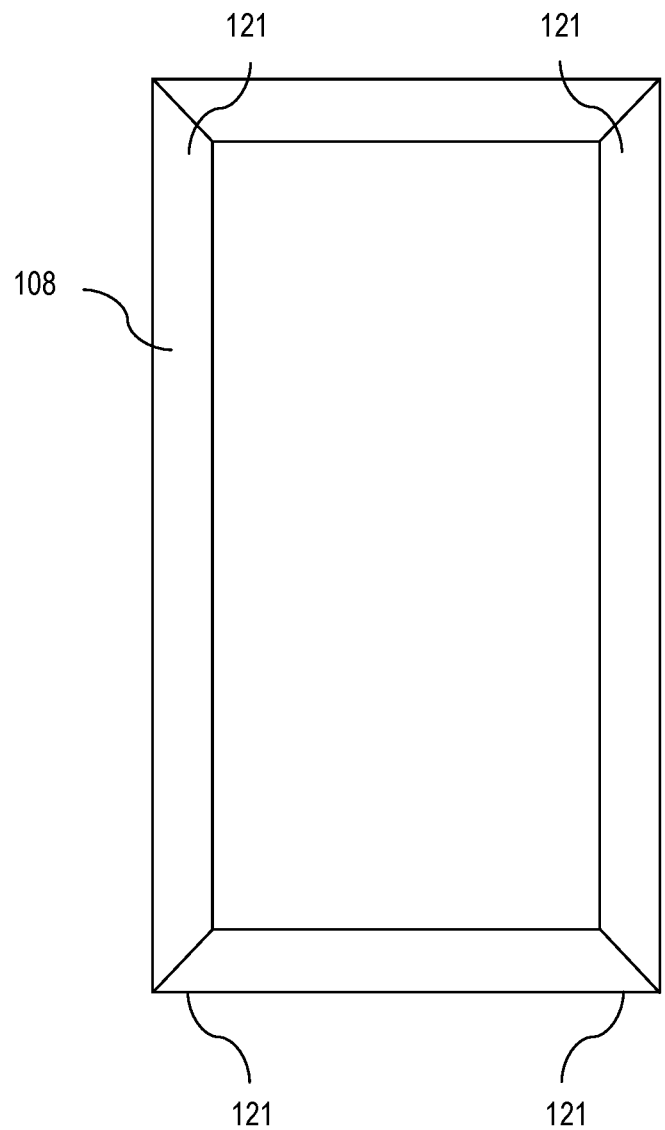
FIG. 4 is a top view of a floor frame that can be used in the unitary floor of FIG. 1.

Referring briefly to FIG. 4, the floor frame 108 includes a rectangular frame defining an area therein. Corner joints 121 join corresponding adjacent sides of the floor frame 108. Each of the corner joints 121 is shown at about a 45 degree cut. However, each of the corner joints 121 can also be mitered butt joint. In alternative implementations, any type of joint can be implemented. For instance, as will be described in greater detail herein, the frame 108 of the unitary floor 100 is dimensioned to fit the form of a conventional semi-trailer. As such, the unitary floor 100 can be a drop in replacement for a conventional semi-trailer floor.

The frame 108 is not required, but provides a convenient way to anchor the unitary floor to a structure, such as a trailer frame. For instance, a wood frame provides a convenient and durable material that allows minimal anchors. In this regard, in an example implementation, anchors are only required around the perimeter, contrary to conventional floors, which require fasteners spaced throughout the surface area. In this regard, the number of anchors (e.g., nails, bolts, screws, etc.) can be reduced from about 1200 for a conventional wood floor, to about 150 for a floor as described herein. This not only reduces cost, but it increases productivity in assembly, and reduces points of possible failure due to leaks, breaks, etc. Still further, the frame 108 provides a convenient anchor for tie downs, etc.

Figure 5:
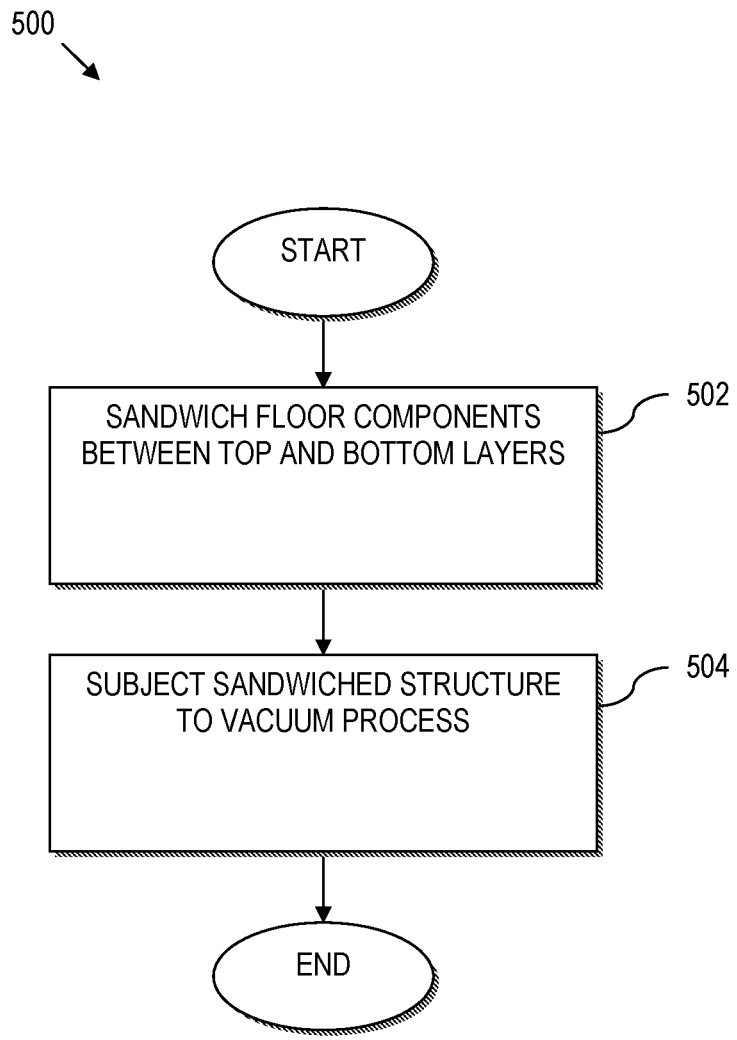
FIG. 5 is a flowchart depicting a general method of fabricating a unitary floor in accordance with an embodiment.

Referring to FIG. 5, a flowchart depicts an example method 500 of fabricating a unitary floor. At 502, the method comprises sandwiching floor components between top and bottom layers.

At 504, the method comprises subjecting the sandwiched structure to a process to form an integral structure that comprises a continuous surface, unitary floor. For example, the process can comprise using fabric and introducing resin in a vacuum process to form the integral structure. Other processes can be used to introduce resin (or adhesive), as will be described herein below. Likewise, processes can be used to apply heat, pressure, or a combination thereof, as will be described herein below.

Figure 6A:
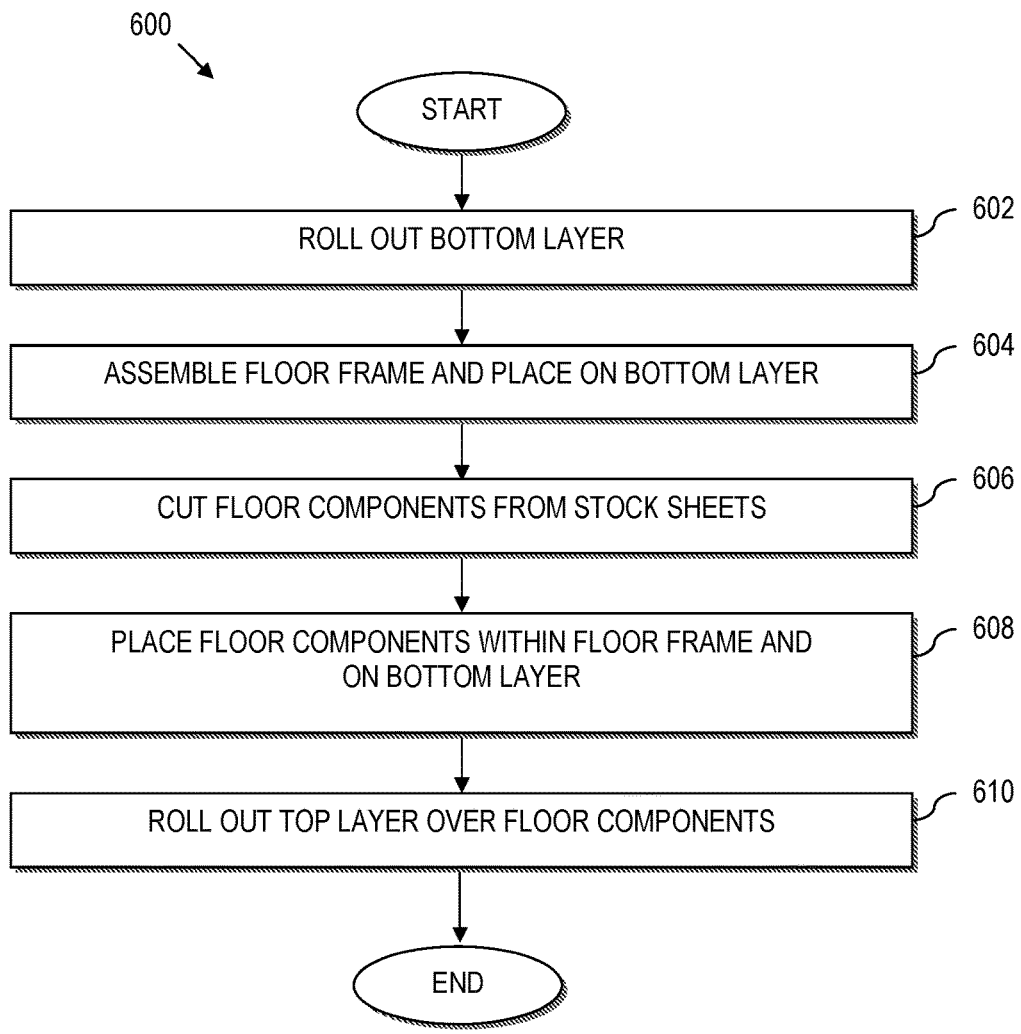
FIG. 6A is a flowchart depicting a specific method of carrying out a first process in the method of FIG. 5.

Referring to FIG. 6A, a flowchart depicts an example process 600 for fabricating the unitary floor 100 according to the method 500 of FIG. 5. As noted above, the method 500 at 502 comprises sandwiching floor components between top and bottom layers. This is implemented in the method of FIG. 6A, by rolling out at 602, a bottom layer (e.g., a fabric layer). For instance, at 602, a layer of fabric can be rolled out in a dimension corresponding to the desired dimension of the unitary floor 100 onto a flat surface. This fabric will define a part of the bottom layer described with reference to FIGS. 1-4.

The process also comprises assembling at 604, a floor frame and placing the floor frame on the bottom layer. Keeping with the above-example, at 604, the floor frame is assembled and is positioned over the bottom fabric.

The process further comprises cutting at 606, floor components from stock sheets. As noted above, the floor components (e.g., corresponding to the floor components 110 of FIGS. 1-4) are cut at 606, e.g., from stock sheets (e.g., rectangular sheets).

The cut components are then positioned within the floor frame so as to entirely fill (i.e., tile) the interior volume of the floor frame. The process also comprises placing at 608, the cut out floor components within the floor frame on the bottom layer (e.g., to fill the entirety of the area within the floor frame). To fill the area within the frame, the process can include cutting each of the floor components into a shape that is a select one of parallelogram-shaped (includes rectangle-shaped and square-shaped), rhombus-shaped, and triangle-shaped.

The floor frame and floor components can include any of the features and constructions set out more fully herein. For instance, floor components can be positioned by aligning material strips of each of the floor components such that a longitudinal strip axis associated with each of the material strips is parallel to a longitudinal central floor axis of the unitary floor. As another example, the floor components can comprise material strips where the material strips that make up a corresponding floor component is a composite assembly that includes a first set of material strips interleaved with a second set of material strips, where the first set of material strips includes a different density compared to the second set of material strips, etc.

In an example implementation, sandwiching the floor components comprises aligning the of floor components to define a continuous assembly, where the material strips that make up a corresponding floor component is a composite assembly that includes the first set of material strips in the form of wood strips interleaved with the second set of material strips in the form of foam strips with cross rib fiberglass. However, other arrangements described herein can alternatively be used.

Still further, cutting at 606 and placing at 608 can comprise forming a scarf joint between adjacent floor components along a line that extends parallel to the longitudinal central floor axis of the unitary floor, forming a scarf joint between adjacent floor components along a line that extends oblique to the longitudinal central floor axis of the unitary floor, or forming scarf joint along lines extending parallel and oblique to the longitudinal central floor axis, as described more fully herein.

The process yet further comprises rolling out at 610, a top layer over the floor components. For instance, at 610, a layer of fabric can be rolled out in a dimension corresponding to the desired dimension of the unitary floor 100 onto the frame and floor components. This fabric will define a part of the top layer described with reference to FIGS. 1-4.

Figure 7:
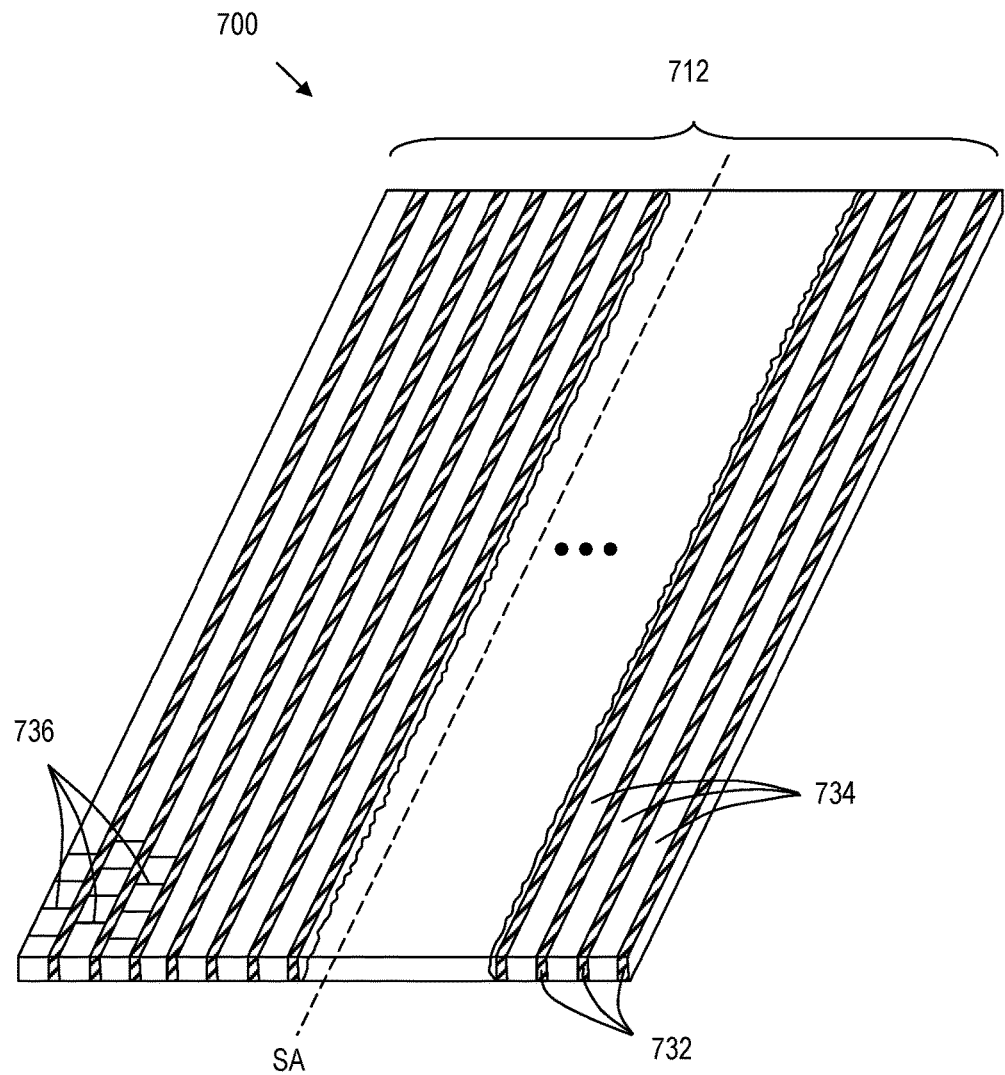
FIG. 7 is a perspective view of an example stock material sheet from which floor components can be cut for the unitary floor of FIG. 2.

Referring briefly to FIG. 7, in the example method, each of the floor components is cut from stock material sheets such as a stock composite material sheet 700. Since the stock composite material sheet 700 is cut to define a floor component, like reference numbers of the floor components 110 of FIG. 1 are shown with numerals 600 higher in FIG. 7.

As shown in FIG. 7, the stock sheet 700 is rectangular. In alternative implementations, the stock sheet 700 can be other than rectangular. The stock sheet 700 includes a plurality of material strips 712 having a longitudinal strip axis SA. The plurality of material strips includes a first set 732 of material strips and a second set 734 of material strips. Each strip of the first set 732 of material strips has a longitudinal strip axis SA that extends along the length of the stock sheet 700. Each strip of the second set 734 of material strips also has a longitudinal strip axis SA that extends along the length of the stock sheet 700. The first set 732 of material strips includes a different density compared to the second set 734 of material strips.

In an example implementation, the first set 732 of material strips comprises long-grain hardwood that is roughened on its outer surface to provide a suitable bonding interface for thermosetting resin. In the example configuration, the second set 734 of material strips comprises foam strips covered on at least one face by fibrous reinforcement material, foam strips with at least one longitudinally spaced transverse reinforcement (such as a plate or other planar reinforcement), or foam strips with cross rib fiberglass 736. In example implementations, the second set 734 of material strips include a helical winding so that any failures will be localized and not "spider web" or otherwise spread. For clarity of discussion herein, the cross rib fiberglass 736 is only shown schematically in FIG. 7 as short offset lines in the lower left corner of the stock sheet 700.

Alternatively, if the second set 734 of material strips comprises foam strips covered or otherwise wrapped on at least one face by fibrous reinforcement material, then the short offset lines in the lower left corner of the stock sheet 700 would schematically represent the fibrous reinforcement material. Also, alternatively, if the second set 734 of material strips comprises foam strips with at least one longitudinally spaced transverse reinforcement, then the short offset lines in the lower left corner of the stock sheet 700 would schematically represent longitudinally spaced transverse reinforcements.

It is understood that in the example embodiment of the cross rib fiberglass 736, the fiberglass extends entirely throughout a cross section of each material strip of the second set 734 of material strips. In alternative implementations, each of the first and second sets 732, 734 of material strips can be implemented using different forms of alternative materials. In other implementations, the wood strips can be replaced by foam, metal (e.g., aluminum), other softer woods, plastics or other materials. Likewise, the foam strips can be replaced with other suitable materials, such as balsa or other light woods, plastic, metal, plastic, other foam compositions, etc.

In an example configuration, the first set 732 of hardwood strips is interleaved with the second set 734 of foam strips with cross rib fiberglass 736. Foam strips with cross rib fiberglass are fiberglass reinforced plastic, and comprises low density closed cell foam that is cross-ribbed with fiberglass.

In an example implementation, the cross-sectional width of a hardwood strip is equal to the cross-sectional width of a foam strip. In another example implementation, the cross-sectional width of a hardwood strip is greater than the cross-sectional width of a foam strip. In yet another example implementation, the cross-sectional width of a hardwood strip is less than the cross-sectional width of a foam strip. In an example implementation, the cross-sectional width of a hardwood strip is 0.75 inches (1.91 centimeters) and the cross-sectional width of a foam strip is 1.25 inches (3.18 centimeters) for a total cross-sectional width of 2.00 inches (5.08 centimeters) between one hardwood strip and one foam strip. In this example configuration, the cross-sectional height can be 1.38 inches (3.51 centimeters).

In alternative implementations, the foam strips can be implemented using alternative materials. The closed cell foam with cross-ribbed fiberglass can be provided by Milliken & Company located in Spartanburg, S.C., U.S.A. Foam strips covered on at least one face by fibrous reinforcement material or foam strips with at least one longitudinally spaced transverse reinforcement can also be provided by Milliken & Company.

In practice, the floor components are not limited to two interleaved strip materials. Rather, any number of alternating strip materials can be utilized in order to obtain designed-for floor properties. Moreover, the interleaving can be strictly alternating, e.g., strictly alternating in a single wood strip, single foam strip, alternating pattern. In alternative configurations, the interleaving is not strictly enforced, e.g., to provide double wood strips along the frame/perimeter, to place wood strips primarily around the perimeter for securement, to build sub-patterns of strips, and alternate the sub-patterns, etc.

Figure 8:
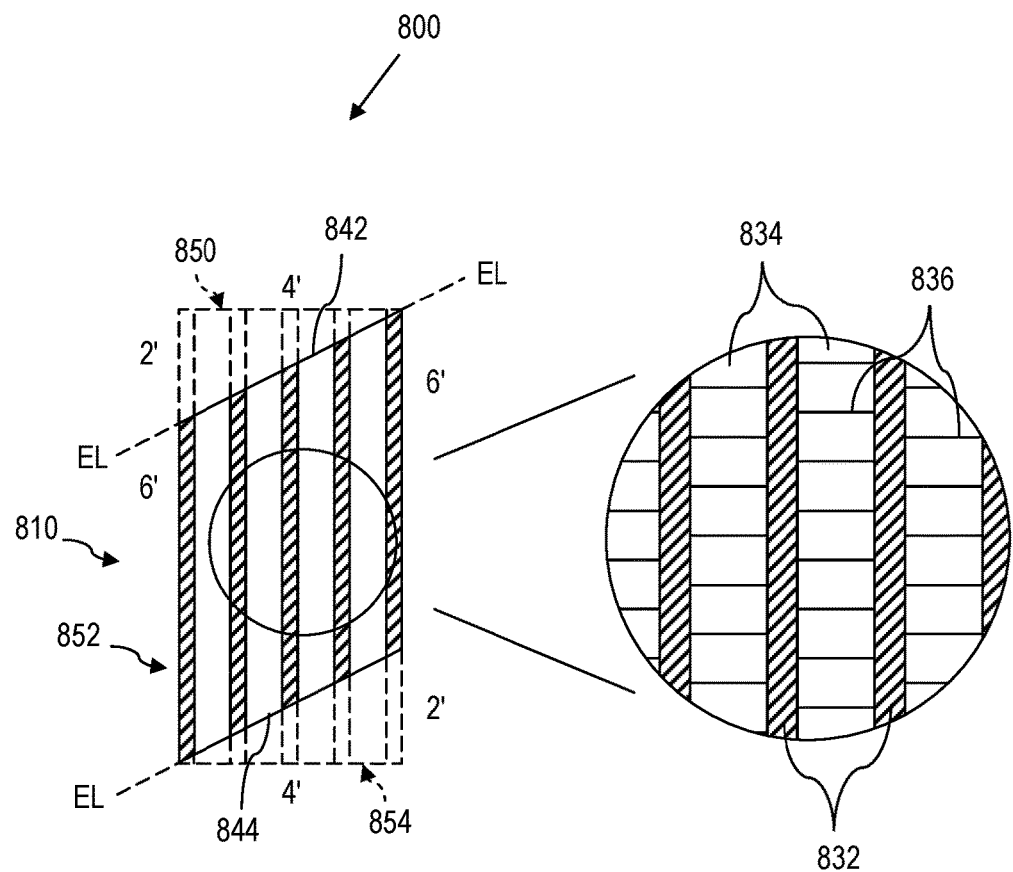
FIG. 8 is a top view of the example stock material sheet of FIG. 7 illustrating an example of the sheet cut into a floor component, further showing an enlarged portion of the floor component to reveal details of the example stock material.

Referring briefly to FIG. 8, a sheet 800 of material strips is illustrated according to aspects of the present disclosure. The sheet 800 is identical to the sheet 700. As such, like components are illustrated with like reference numerals 100 higher than shown in FIGS. 7, and 700 higher than shown in FIG. 1. The sheet 800 is cut along lines EL to produce the floor component 810.

As illustrated, the stock sheet 800 has two cuts 842, 844 to provide three cut sections 850, 852, 854. The middle section 852 will serve as a floor component 810 (analogous to the floor component 110 of FIG. 1). The first set 832 of material strips (e.g., wood) and the second set 834 of material strips (e.g., foam strips including cross rib fiberglass 836) contained in each cut section 852 have an orientation as shown in the enlarged portion of FIG. 8. The cut section 852 can be used as any one of the full-size floor components 110b, 110c, 110d, 110e, 110f, 110i, 110j, 110k, 110m, 110n, and 110p shown in FIG. 2. In an example implementation, each material strip of the denser set of the first and second sets of material strips is spaced apart from an adjacent material strip of the denser set of the first and second sets of material strips by no more than six inches (15.24 cm). This is selected to correspond to the width of a forklift tire. As such, in this example, no matter how a forklift drives on the floor, each load bearing forklift tire will always be over at least one of the denser strips. In this regard, the specific application and desired floor performance will dictate the spacing to balance strength and weight for the given application.

In an illustrative example implementation, the stock sheet 800 has a length of eight feet (approximately 2.44 meters) and a width of four feet (approximately 1.22 meters). Solely for purposes of example, the stock sheet 800 is cut by removing triangular wedges from each end of the sheet. The triangular wedges each have a base of two feet (approximately 0.61 meters) and a height of four feet (approximately 1.22 meters), and correspond to the cut section 850 and the cut section 854. The remaining section 852 is used in the floor construction.

Each of the trim-size floor components (i.e., floor components 110a, 110g, 110h, and 110q shown in FIG. 2) is cut to size as needed. Each trim-size floor component is cut such that the longitudinal strip axis SA of its plurality of material strips is parallel to the longitudinal central floor axis FA of the unitary floor 100.

Referring back to FIG. 6A, in 608, each of the cut out floor components from 606 is placed within the floor frame (and are thus positioned on the bottom layer of fabric). More specifically, the floor components are assembled within the floor frame. The floor components entirely fill the area defined by the floor frame.

In 610, after all of the cut out floor components from 606 are placed within the floor frame, the top layer is rolled out on the cut out floor components. More specifically, a second fabric is laid over the floor components and the floor frame so as to define a component of the top layer.

Figure 6B:
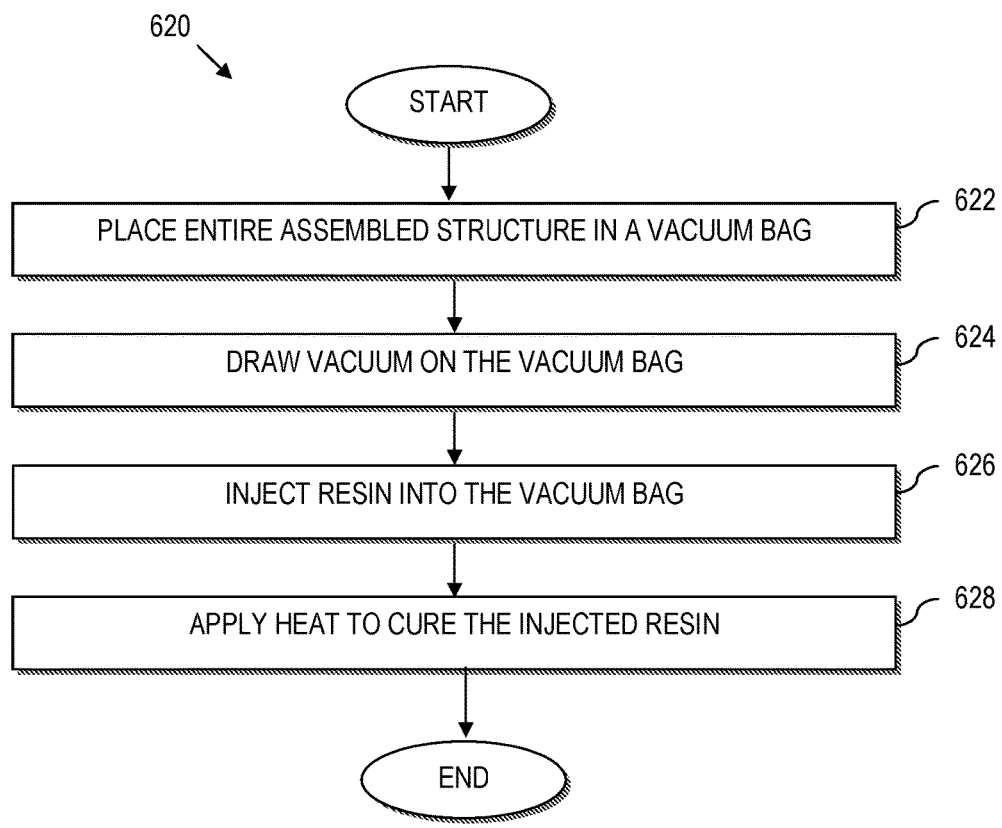
FIG. 6B is a flowchart depicting a specific method of carrying out a second process in the method of FIG. 5.

Referring to FIG. 6B, subjecting the sandwiched structure to vacuum process at 504 of FIG. 5 can be carried out in the method 620 of FIG. 6B by placing at 622, the entire assembled structure in a vacuum bag; drawing at 624, a vacuum on the vacuum bag; injecting at 626, resin into the vacuum bag; and optionally applying at 628, heat to cure the injected resin.

For instance, at 622, the entire assembled structure formed in the method 600 of FIG. 6A is placed in a vacuum bag. At 624, a vacuum is drawn on the vacuum bag. At 626, a suitable resin, such as a low viscosity resin, is then injected into the vacuum bag to infuse the resin into the structure within the vacuum bag. At 628, heat is optionally applied to cure the injected resin which has been infused into the structure in the vacuum bag. The above-described operations at 622, 624, 626, 628 of FIG. 6B comprise a vacuum infusion process. Alternatively, other processes can be utilized, such as an extrusion process, pultrusion, compression molding, etc. Also, pre-impregnated materials can be used to form the top and bottom layers. Moreover, resin (or adhesive) can be introduced and hardened under heat and/or pressure for instance. As yet another example, a curable thermosetting or hardenable thermoplastic resin can be heated to form a continuous surface. Still further, a continuous feeder can be used with the machines manufacture the strips such that floors of arbitrary length can be manufactured with continuous intermediate layers in the longitudinal direction and/or lateral direction.

Example Semi-Trailer Floor

Figure 9:
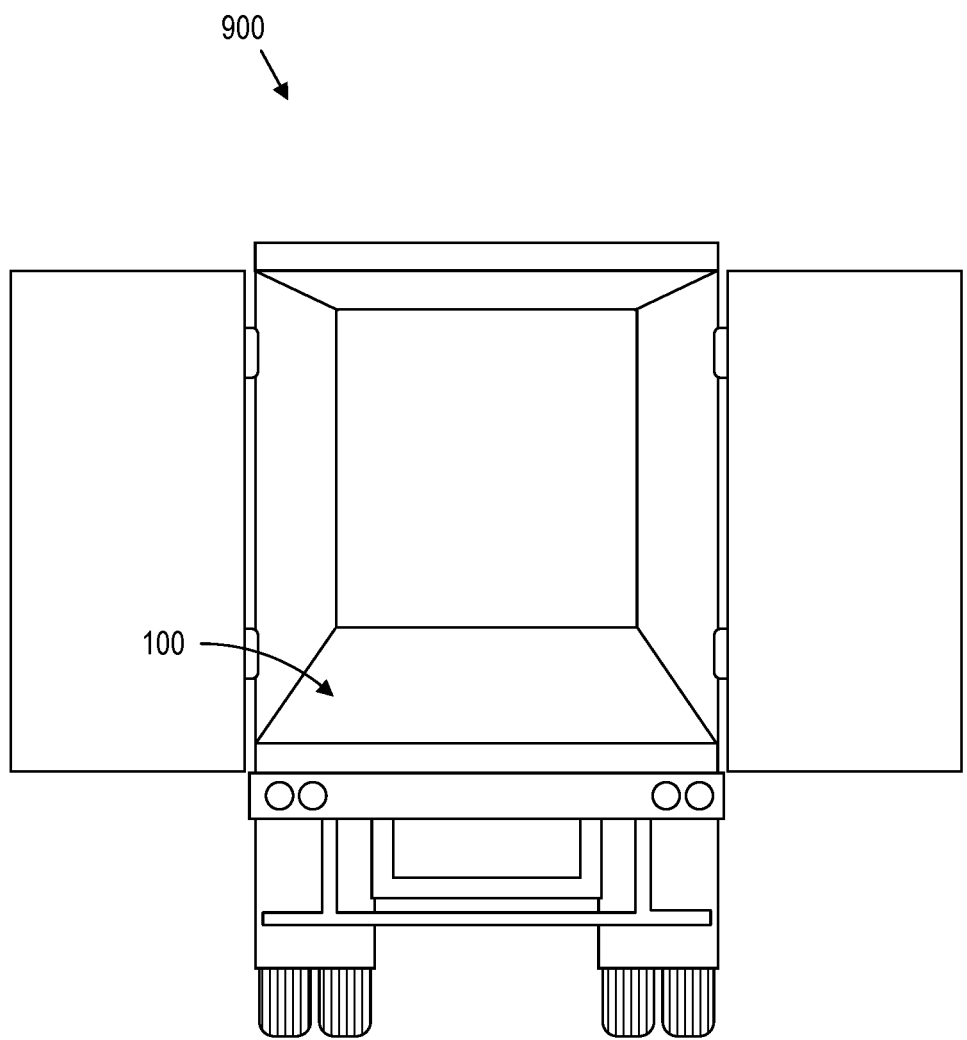
FIG. 9 is a rear end view of a semi-trailer embodying a unitary floor constructed in accordance with an embodiment.

Referring to FIG. 9, various techniques herein provide a unitary floor system that comprises the continuous surface, unitary floor 100. In a practical application, the unitary floor 100 is assembled having substantially a vehicular trailer length and substantially a vehicular trailer width.

For instance, a box trailer 900, which may optionally be part of the system, includes a container that is typically over 8 feet (about 2.44 meters) wide and a length ranging from about 28 feet (about 8.53 meters) to over 50 feet (about 15.24 meters) in length in some circumstances. Accordingly, the overall frame dimensions and the size of each sheet will determine the number of floor components necessary to assemble a unitary floor.

Figure 10:
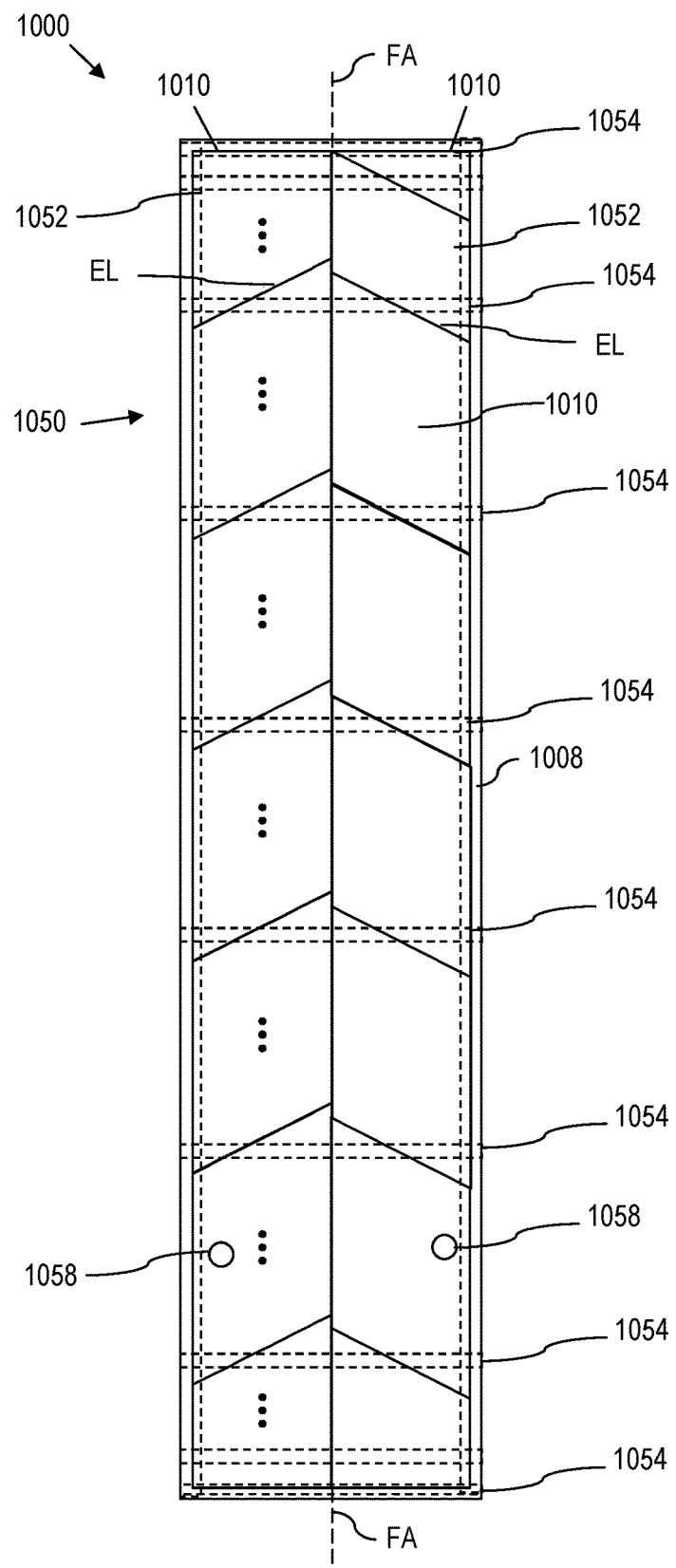
FIG. 10 illustrates another embodiment of a unitary floor, shown mounted on a semi-trailer frame.

Referring to FIG. 10, a unitary floor 1000 is illustrated installed on a frame of a trailer, e.g., the trailer of FIG. 9. In this regard, the frame of the trailer may be part of the unitary floor system (with or without the corresponding box trailer). The unitary floor 1000 includes the same features as the unitary floor 100 described with reference to FIGS. 1-9 above. In the illustrated floor 1000, the top layer is removed to illustrate key aspects of this configuration. Notably, the unitary floor 1000 includes a frame 1008 (analogous to the frame 108 described herein). Moreover, floor components 1010 are tiled within the frame 1008. Here, the floor components 1010 are analogous and can thus include one or more of the features of the floor components 110, 810 described more fully herein.

The exemplary trailer frame 1050 includes longitudinal frame members 1052 (shown in dashed lines), which run along the outside edge in the longitudinal direction on both sides of the trailer. The longitudinal frame members 1052 are typically "C" shaped beam. The trailer frame 1050 also includes lateral frame members 1054 that span between the longitudinal frame members 1052. For clarity of discussion herein, only some of lateral frame members 1054 are shown spanning between the longitudinal frame members 1052. Lateral frame members not shown are depicted by the ellipsis in FIG. 10. The lateral frame members 1054 are typically "I" beams. In this example implementation, the frame 1008 is secured to the trailer frame 1050 by fastening the frame 1008 to the longitudinal frame members 1052.

As described in greater detail herein, one or more of the edge lines along the outer perimeter of the unitary floor 1000 can be perpendicular to the longitudinal central floor axis FA. This is seen in the floor components 1010 that fall into the corners of the frame 1008. Also, one or more of the floor components 1010 includes at least one edge line EL that is oblique to the longitudinal central floor axis FA. As illustrated, adjacent floor components 1010 (e.g., on opposite sides of the longitudinal central floor axis FA, include edge lines that are slightly staggered and are oblique to the to the longitudinal central floor axis FA. The oblique edge EL provides a tolerance during manufacturing that will ensure that the edges of each floor component 1010 straddle across a corresponding lateral frame member 1054. In this regard, the angle may be up to 60 degrees relative to the longitudinal central floor axis FA. While not strictly required, this configuration is advantageous for floors with high load requirements, e.g., where the floor, and hence the floor components 1010 must satisfy a 20,000 pound load rating.

Notably, the unitary floor described herein is a single-component drop in replacement for a conventional trailer floor. In this regard, the unitary floor can be used with the existing frame members (e.g., the longitudinal frame members 1052 and lateral frame members 1054 shown in FIG. 10) without modification of the trailer construction. Moreover, due to the drop in capability of the unitary floor herein, conventional manufacturing processes and assembly lines do not require retooling, reworking or other significant changes to integrate the unitary floor into the production of new trailers.

The above-described sandwich structure of the unitary floor 1000 is relatively lightweight and relatively high strength capable of withstanding relatively high mechanical stresses. In an example implementation, the lightweight is attributed at least in part to the continuous surface, unitary floor 1000 having anchors (e.g., nails, bolts, screws, etc.) only around the outer perimeter of the unitary floor 1000 to trailer frame members (i.e., the longitudinal frame members 1052 and the lateral frame members 1054). The lightweight is also attributed at least in part to the use of foam strips as set out in greater detail herein, whereas the high strength is attributed at least in part to the use of a relatively denser material, e.g., long-grain hardwood which is roughened on its outer surface to provide a thermosetting resin surface. The high strength is also attributed at least in part to the offset of the floor components along the longitudinal extent of the unitary floor. The high strength is further attributed at least in part to each oblique edge line EL of each of the floor components straddling at least one I-beam or C-beam of the vehicular trailer in which the unitary floor is installed.

Moreover, the high strength is attributed at least in part to the longitudinal strip axes SA of the first and second sets of material strips of each of the floor components extending in a direction that is parallel to the longitudinal central floor axis FA of the unitary floor, e.g., best illustrated in FIG. 7. A parallel configuration of the first and second sets of material strips relative to the longitudinal central floor axis FA of the unitary floor 1000 can achieve a 20,000 pound forklift truck axle load rating as per Truck Trailer Manufacturers Association (TTMA) Standards, for example.

The unitary floor 1000 can also include integral inserts 1058 for tie downs to secure cargo carried by the trailer. Although only two inserts 1058 are illustrated for sake of simplicity, in practice, there can be any number of inserts in any position along the floor. Moreover, material can be used between the floor and beams to prevent the potential for chatter.

In a practical application, the example unitary floor 100 shown in FIGS. 1-4 is implemented as a floor for a semi-trailer 900 such as shown in FIG. 9 and FIG. 10. Notably, a forklift truck is often used to load cargo onto and unload cargo from a vehicular trailer floor. Much mechanical stress including bending, crushing, and shearing is placed on the trailer floor each time the forklift truck loads cargo or unloads cargo. The repeated mechanical stress on the trailer floor can result in mechanical damage including fatigue damage to a conventional floor.

Accordingly, a trailer floor typically has a load rating which is indicative of the ability of the trailer floor to withstand mechanical stresses. The trailer floor can be designed to increase the load rating to increase the ability to withstand mechanical stresses. However, with a conventional floor, increasing the load rating comes at the expense of harder wood/thicker planks used to form the floor. The additional wood greatly increases the weight of the semi-trailer, thus decreasing the fuel efficiency of the tractor pulling the semi-trailer.

However, the unitary floor 100 provides flooring solutions that meet load ratings with a floor that weighs 40% less than a comparable wooden floor. Moreover, the unitary floor 100 provides a continuous, smooth surface, reducing stress and vibration in forklifts that travel into and out of the semi-trailer. These stresses and vibrations cannot be avoided in a conventional floor that is comprised of wooden planks seamed together.

Although the above description describes the longitudinal strip axes SA of the material strips of a floor component being parallel to the longitudinal central floor axis FA, it is conceivable that the longitudinal strip axes SA of the material strips of a floor component may not be parallel to the longitudinal central floor axis FA depending upon how the floor component was cut from a stock material sheet. Accordingly, it is conceivable that the longitudinal strip axes SA of the material strips of one floor component is at an one angle relative to the longitudinal central floor axis FA while the longitudinal strip axes of the material strips of another floor component is at a different angle relative to the longitudinal central floor axis FA of the unitary floor.

Further, although the above description describes a unitary floor for a vehicular trailer (such as a box trailer), it is conceivable that a unitary floor be provided for other applications. Other applications include flatbed trailers, refrigerated trailers, refrigerated trucks, dry shipping containers, refrigerated shipping containers, expandable containers, rail cars, and the like, for examples.

Also, although the above description describes the unitary floor 100 shown in FIG. 1 as having two floor sections (i.e., one section to the left of the longitudinal central floor axis FA and the other section to the right of the longitudinal central floor axis FA), it is conceivable that a unitary floor may comprise any number of floor sections across a lateral direction, as the specific application dictates.

Also, although the above description describes each of the floor components 110 having a configuration in which one or more edge lines EL extend oblique to the longitudinal central floor axis FA of the unitary floor 100, it is conceivable that a floor component may have a configuration that is other than an oblique configuration relative to a longitudinal central floor axis of a unitary floor. For example, one or more edge lines of a floor component may extend perpendicular (i.e., 90 degrees) to a longitudinal central floor axis of a unitary floor.

Figure 11:
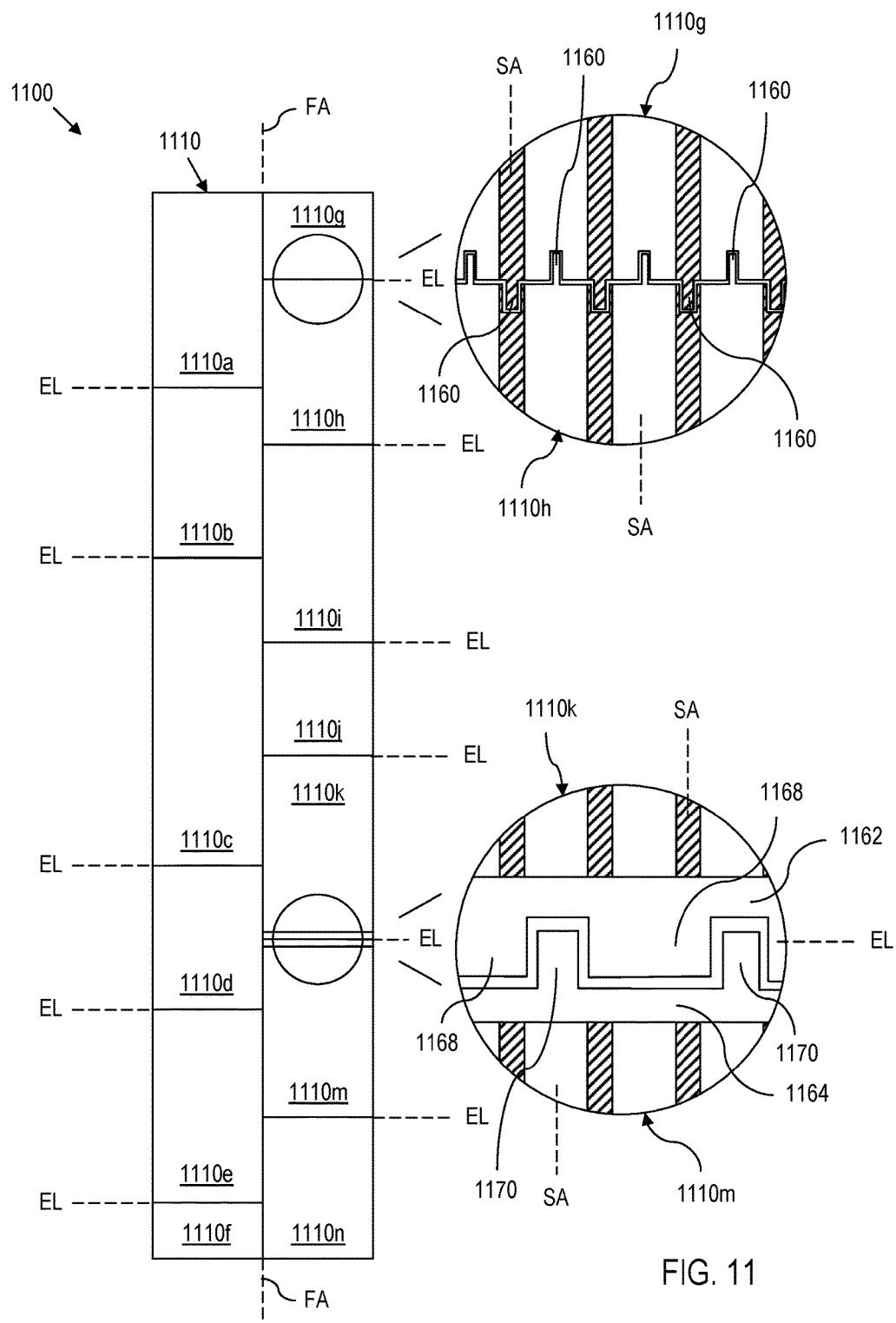
FIG. 11 is a view similar to FIG. 2, and showing other embodiments of a unitary floor.

For example, as shown in example embodiment of FIG. 11, a unitary floor 1100 includes a plurality of floor components 1110, designated individually as 1110a, 1110b, 1110c, 1110d, 1110e, 1110f, 1110g, 1110h, 1110i, 1110j, 1110k, 1110m, and 1110n. The floor components 1110 can include any of the features set out with regard to the floor components 110, 810, 1010, etc., described more fully herein, such as interleaved material strips, etc.

Moreover, the plurality of floor components 1110 includes at least one pair of adjacent floor components having an intersecting edge (lateral edge) that is perpendicular to the longitudinal strip axes SA of the associated plurality of material strips and thereby perpendicular to the longitudinal central floor axis FA of the unitary floor 1100. The intersecting edge of a pair of adjacent floor components is where the two edges (i.e., the two edge lines EL) of the two adjacent floor components meet. For simplicity, intersecting lines corresponding to intersecting edges of pairs of adjacent floor components shown in FIG. 11 are also designated with the reference letters "EL".

Each intersecting edge EL on the one side of the longitudinal central floor axis FA is offset along the longitudinal extent of the longitudinal central floor axis FA from each intersecting edge EL on the opposite side of the longitudinal central floor axis FA. In alternative implementations, the edge lines of adjacent pairs of floor components aligns in the lateral direction, e.g., to ensure that the edges align along a beam (e.g., the lateral frame members 1054 of FIG. 10).

In an example implementation of the unitary floor system, at least one pair of adjacent floor components includes protrusions projecting into corresponding recessions along an mating adjacent edge thereof, thus interlocking the at least one pair of adjacent floor components together.

In the illustrated implementation of FIG. 11, each floor component includes a plurality of protrusions projecting into a corresponding plurality of recessions in an adjacent floor component to interlock the pair of adjacent floor components together. More specifically, as shown in the top enlarged portion of FIG. 11, each one of two adjacent floor components 1110g, 1110h includes a plurality of protrusions 1160 projecting into a corresponding plurality of recessions in the other one of the two adjacent floor components 1110g, 1110h to interlock the two adjacent floor components 1110g, 1110h together. The plurality of protrusions 1160 can be formed on each of the floor components 1110g, 1110h using any suitable manufacturing technique. In a further example implementation, the protrusions and corresponding recessions can also and/or alternatively be implemented along the longitudinal edge to lock adjacent floor components.

In another implementation (shown in the same figure for simplicity), the protrusions and recessions can be implemented using a header. More specifically, as shown in the bottom enlarged portion of FIG. 11, adjacent floor components 1110k, 1110m each include a header portion. As shown in the example implementation of FIG. 11, the floor component 1110k has a header portion 1162, and the floor component 1110m has a header portion 1164. The header portion 1162 of the floor component 1110k has a plurality of protrusions 1168 projecting into a corresponding plurality of recessions in the floor component 1110m. Similarly, the header portion 1164 of the floor component 1110m has a plurality of protrusions 1170 projecting into a corresponding plurality of recessions in the floor component 1110k. This interlocks the two adjacent floor components 1110k, 1110m together. As with the above example, in a further example implementation, the protrusions and corresponding recessions can also and/or alternatively be implemented along headers that extend along the longitudinal edge to lock adjacent floor components. The header portion may comprise wood, plastic, metal, foam or some other suitable material. The protrusions and recessions can be replaced with other techniques, e.g., biscuits, dove-tails, or other joinery techniques, and may be used in lieu of angled scarf joints described above.

Further, although the above description describes fabricated unitary floors for installation in new vehicular trailers, it is conceivable that existing vehicular trailers can be retrofitted with unitary floors fabricated in accordance with different embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A unitary floor system comprising:
   a top layer;
   a bottom layer; and
   an intermediate layer having a longitudinal central floor axis along a major length of the intermediate layer, thereby defining a first side and a second side, the intermediate layer comprising:
      floor components that define at least one edge line, wherein the floor components are tiled together and sandwiched between the top layer and the bottom layer to provide an integral structure that comprises a continuous surface, unitary floor; and
      a frame that surrounds the floor components;
   wherein:
      each of the floor components comprises a composite assembly of material strips that includes a first set of material strips and a second set of material strips,
      the first set of material strips has a different density compared to the second set of material strips; and
      edge lines of the floor components span between the longitudinal central floor axis and the frame, wherein the floor components do not cross the longitudinal central floor axis from the first side to the second side.

2. The unitary floor system of claim 1, wherein edge lines of floor components on the first side of the longitudinal central floor axis are offset along the longitudinal central floor axis from edge lines of floor components on the second side of the longitudinal central floor axis.

3. The unitary floor system of claim 1, wherein the frame comprises a plurality of locations to fasten the unitary floor to a trailer frame.

4. The unitary floor system of claim 1, wherein the frame comprises a plurality of locations for anchor tie downs around the perimeter of the frame.

5. The unitary floor system according to claim 1, wherein the floor components are tiled together such that the material strips have a longitudinal strip axis that is parallel to a longitudinal central floor axis of the unitary floor.

6. The unitary floor system according to claim 1, wherein:
   each edge line that is oblique to the longitudinal central floor axis forms an angle less than 60 degrees relative to the longitudinal central floor axis.

7. The unitary floor system according to claim 1, wherein:
   the floor components are tiled together such that the material strips have a longitudinal strip axis that is parallel to a longitudinal central floor axis of the unitary floor; and
   the floor components are staggered so that adjacent floor components on opposite sides of the longitudinal central floor axis do not align along at least one edge.

8. The unitary floor system according to claim 1, wherein:
   the top layer of the integral structure comprises a continuous surface;
   the bottom layer of the integral structure comprises a continuous surface; and
   the first set of material strips is interleaved with the second set of material strips for at least one floor component.

9. The unitary floor system according to claim 8, wherein for at least one floor component:
   the first set of material strips includes wood strips, and the second set of material strips includes foam strips with cross rib fiberglass.

10. The unitary floor system according to claim 8, wherein for at least one floor component:
    the first set of material strips includes wood strips, and the second set of material strips includes foam strips covered on at least one face by fibrous reinforcement material.

11. The unitary floor system according to claim 8, wherein for at least one floor component:
    the first set of material strips includes wood strips, and the second set of material strips includes foam strips with at least one longitudinally spaced transverse reinforcement.

12. The unitary floor according to claim 1, further comprising a floor frame defining an area that is entirely filled with the floor components, wherein the floor frame is dimensioned to fit the form of a conventional semi-trailer.

13. The unitary floor system according to claim 1, wherein, for at least one floor component:
the first set of material strips is more dense than the second set of material strips; and
the first set of material strips is interleaved with the second set of material strips for at least one floor component such that adjacent strips of the first set of material strips is spaced apart by no more than six inches (15.24 cm).

14. The unitary floor system of claim 13, wherein the unitary floor can satisfy a 20,000 pound forklift truck axle load rating.

15. A unitary floor system comprising:
a top layer;
a bottom layer; and
an intermediate layer having a longitudinal central floor axis along a major length of the intermediate layer, thereby defining a first side and a second side, the intermediate layer comprising:
floor components that define at least one edge line, wherein the floor components are tiled together and sandwiched between the top layer and the bottom layer to provide an integral structure that comprises a continuous surface, unitary floor; and
a frame that surrounds the floor components;
wherein:
each of the floor components comprises a composite assembly of material strips that includes a first set of material strips and a second set of material strips,
the first set of material strips has a different density compared to the second set of material strips;
at least one edge line of the floor components on one opposing side extends oblique to the longitudinal central floor axis; and
edge lines of floor components on the first side of the longitudinal central floor axis are offset along the longitudinal central floor axis from edge lines of floor components on the second side of the longitudinal central floor axis.

16. The unitary floor system of claim 15, wherein the frame comprises a plurality of locations to fasten the unitary floor to a trailer frame.

17. The unitary floor system of claim 15, wherein the frame comprises a plurality of locations for anchor tie downs around the perimeter of the frame.

18. The unitary floor system according to claim 15, wherein the floor components are tiled together such that the material strips have a longitudinal strip axis that is parallel to a longitudinal central floor axis of the unitary floor.

19. The unitary floor system according to claim 15, wherein:
each edge line that is oblique to the longitudinal central floor axis forms an angle less than 60 degrees relative to the longitudinal central floor axis.

20. The unitary floor system according to claim 15, wherein:
the floor components are tiled together such that the material strips have a longitudinal strip axis that is parallel to a longitudinal central floor axis of the unitary floor; and
the floor components are staggered so that adjacent floor components on opposite sides of the longitudinal central floor axis do not align along at least one edge.

* * * * *